No. 826,914. PATENTED JULY 24, 1906.
L. A. ALLWINE.
VEHICLE WHEEL.
APPLICATION FILED DEC. 2, 1905.
2 SHEETS—SHEET 2.
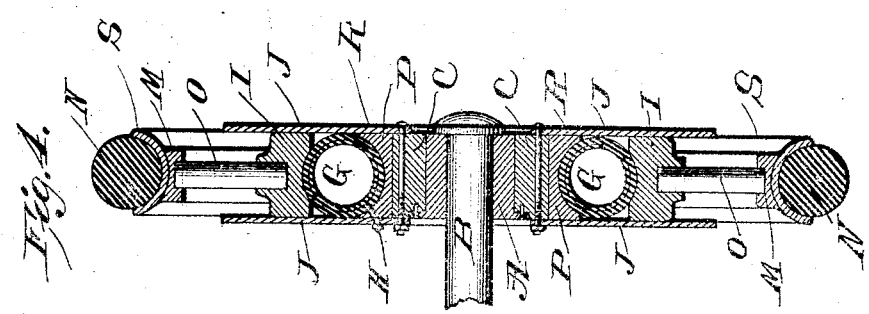
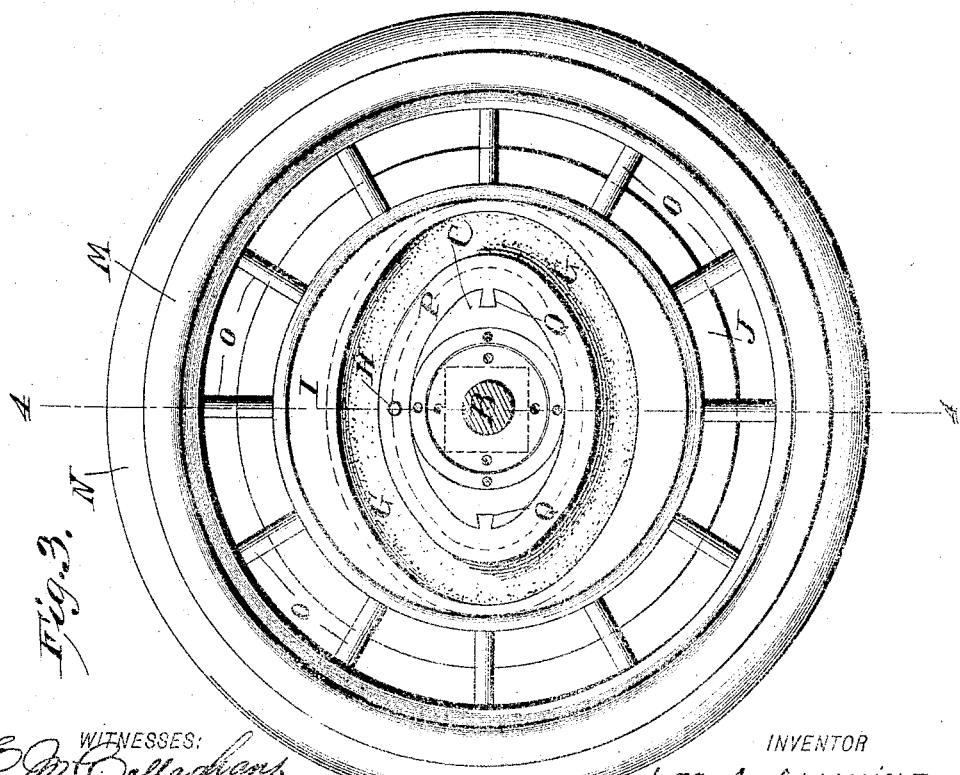
WITNESSES:
INVENTOR
LEO A. ALLWINE
BY
ATTORNEYS

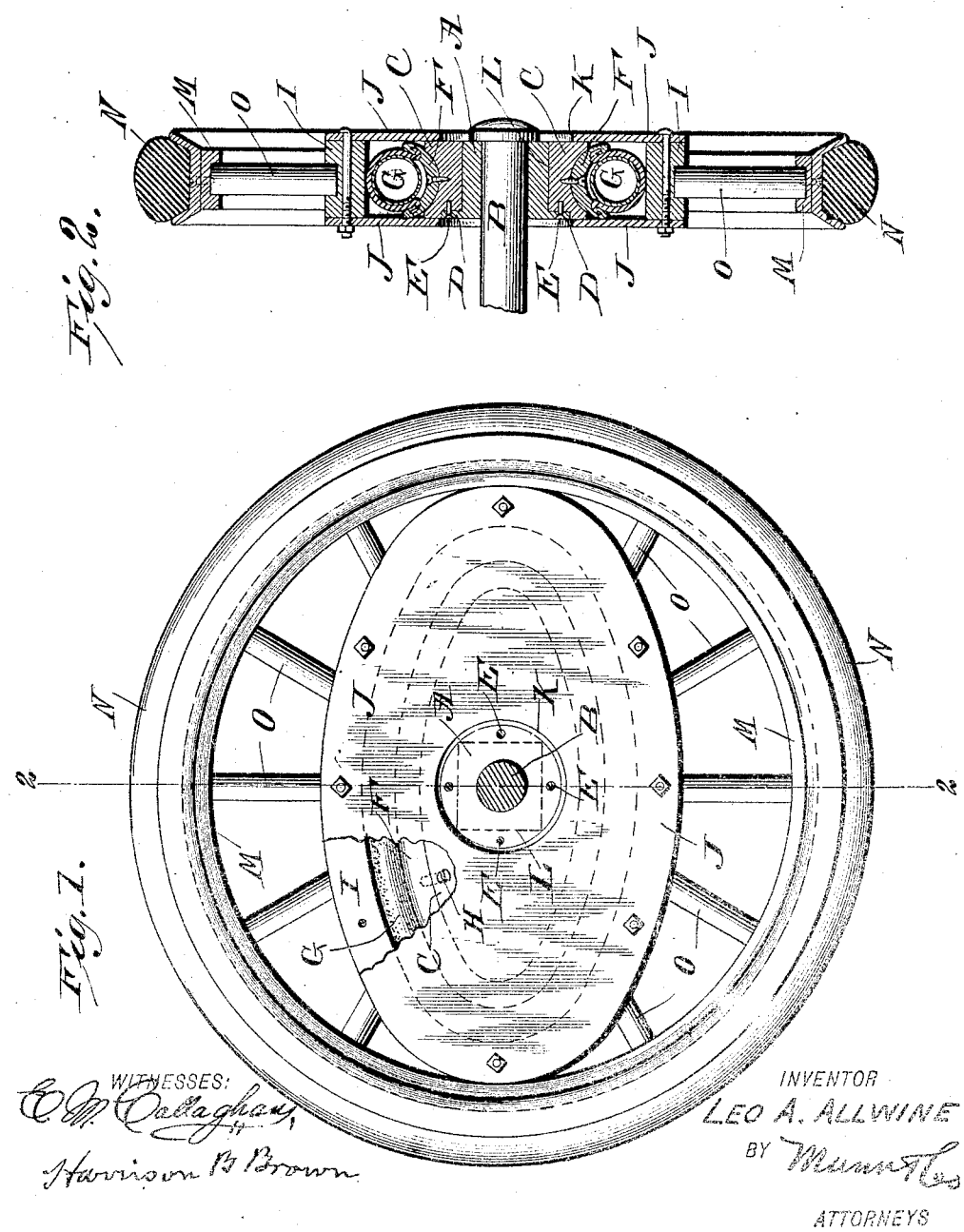

UNITED STATES PATENT OFFICE.

LEO ALOISE ALLWINE, OF LORAIN, OHIO, ASSIGNOR OF ONE-HALF TO LEO C. WORDEN, OF LORAIN, OHIO.

VEHICLE-WHEEL.

No. 826,914.           Specification of Letters Patent.           Patented July 24, 1906.

Application filed December 2, 1905. Serial No. 289,955.

*To all whom it may concern:*

Be it known that I, LEO ALOISE ALLWINE, a citizen of the United States, residing at Lorain, in the county of Lorain and State of Ohio, have invented certain new and useful Improvements in Vehicle-Wheels, of which the following is a specification.

The invention relates to wheels commonly known as "elastic" or "spring" wheels, and has for its object the cure of objections to wheels of this character as they have heretofore been constructed.

The invention consists of a novel arrangement and construction of cushioning means interposed between two independent portions in the make-up of the wheel and also novel details of construction whereby the invention is practiced.

In the following detail description of my invention reference is had to the accompanying drawings, wherein—

Figure 1 is a side elevation of the completed wheel, part broken away. Fig. 2 is a transverse sectional view taken on line 2 2 of Fig. 1. Fig. 3 is a view in side elevation, showing another form or construction of the main feature characterizing my invention; and Fig. 4 is a transverse sectional view taken on line 4 4 of Fig. 3.

In carrying out my invention I employ an' axle-box A, constructed for arrangement on a cylindrical or other form of spindle B. In connection with the box A, I employ, preferably, an elliptical hub C. The form of the latter may be modified, however, into any contour not circular. Therefore, obviously I do not restrict myself to the construction of the box C illustrated in my drawings. The spindle or axle-box A and the hub C may be fixedly connected by any approved means; but as one means thereof I provide the box with a flange D, adapting the same for application of bolts E, tapped into the hub, substantially as shown in Figs. 2 and 4. On the outer periphery of the hub C any suitable surrounding seat F is provided adapted for the reception of a rubber or other yielding tube G, adapted for inflation through a suitable valve or otherwise-closed nipple H. (See Fig. 1.)

I denotes an elliptical rim made sufficiently larger than the hub C to contain therebetween the yielding tube G, when the same is inflated, adapted for cushioning effect, as will be understood. Plates J, made elliptical or of other form, are secured by bolts or approved means to opposite sides of the rim I. Said plates J are constructed to extend inwardly from their attachment to the rim I and adapted to movably embrace the cushion G and the hub C. It is designed that with the construction shown by Fig. 2 the plates J shall have free sliding movement on the hub C to permit free cushioning operation of the tube G. An opening K is provided near the center of the plates J, affording access to the axle-spindle B and also the fastening means E of the hub A.

It will be noticed that the exterior of the box A is made square, (see dotted lines L in Fig. 1,) whereby to prevent turning action of the box A in the hub C.

M denotes any desired type of felly or rim having pneumatic or solid-rubber tire N. The felly and elleptical rim I may be connected by a suitable metal sheet, wire spokes commonly employed in the construction of a bicycle-wheel, or by simple wheel-spokes O, substantially as shown.

The form of wheel illustrated by Figs. 3 and 4 of my drawings differs from the form shown by Figs. 1 and 2 in having the elliptical plates J fixedly secured to the hub C by bolts or other approved means, thereby serving as confining-guides for the rim I and permitting free vibration of the latter as opposed by the cushioning action of the pneumatic tube G.

With the construction shown, Figs. 1 and 2, any obvious form of socket F may be employed for holding the tube on the hub; but with the construction of wheel illustrated in Figs. 3 and 4 I employ an elliptical collar P, having an outer groove in which the tube G is seated, and inner wedge-shaped tongues or projections Q, (see Fig. 3,) entered into likeshaped slots in opposite sides of the hub C.

In the make-up of my improved wheel it will be noticed that the inner portion R, consisting of the box, hub, and pneumatic cushion, has substantially fixed relation with the spindle or axle B, save rotary motion, while the outer portion S, consisting of the rim I, spokes and felly M, are free to move, and thereby, through cushioning action of the pneumatic tube G, take up vibration and relieve the person riding in the vehicle using my improved wheels.

What I claim is—

1. The combination in a wheel employing relatively movable and non-movable portions, of an elliptical hub having a suitable box, a socket on the hub, an elliptical cushion seated in the socket, a rim surrounding the cushion, plates fixedly secured to one portion of the wheel, adapted for holding the rim on the cushion, and a felly suitably supported on said rim, substantially as described.

2. The combination in a wheel employing relatively movable and non-movable portions, of an elliptical hub, an elliptical cushion on the hub, a similarly-formed rim seated on the cushion, plates fixedly secured to one portion of the wheel, adapted for holding the rim on the cushion, and a felly suitably supported on the rim.

LEO ALOISE ALLWINE.

Witnesses:
W. B. THOMPSON
LEO C. WARDEN